(12) United States Patent
Someya et al.

(10) Patent No.: US 6,326,753 B1
(45) Date of Patent: *Dec. 4, 2001

(54) CONTROLLER OF ELECTRIC POWER-STEERING SYSTEM

(75) Inventors: Kenji Someya; Atsushi Tanaka; Shuji Endo; Hideyuki Kobayashi, all of Maebashi (JP)

(73) Assignee: NSK Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,490

(22) Filed: Jan. 6, 1999

(30) Foreign Application Priority Data

Jan. 23, 1998 (JP) .................................. 10-011514

(51) Int. Cl.$^7$ ........................................ B62D 5/04
(52) U.S. Cl. ..................... 318/471; 388/934; 180/443
(58) Field of Search .................... 318/599, 641, 318/646, 648, 432, 433, 434, 471, 489, 293; 388/907.2, 902, 903, 934; 180/443, 446

(56) References Cited

U.S. PATENT DOCUMENTS

| | | | |
|---|---|---|---|
| 4,611,682 | * | 9/1986 | Yasuda et al. ............... 318/473 X |
| 4,771,843 | * | 9/1988 | Shimizu ......................... 180/79.1 |
| 4,771,845 | * | 9/1988 | Shimizu ....................... 318/473 X |
| 4,800,974 | * | 1/1989 | Wand et al. .................... 180/79.1 |
| 4,834,202 | * | 5/1989 | Shimizu ........................... 180/79 |
| 4,986,379 | * | 1/1991 | Morishita ..................... 318/599 X |

FOREIGN PATENT DOCUMENTS

| | | |
|---|---|---|
| 3789033 | 12/1987 | (DE) . |
| 0358111 | 3/1990 | (EP) . |

* cited by examiner

*Primary Examiner*—Bentsu Ro
(74) *Attorney, Agent, or Firm*—Sughrue, Mion, Zinn, Macpeak & Seas, PLLC

(57) ABSTRACT

A controller of an electric power steering system corrects a motor current command value by using a temperature of a motor, and compensates a variation in a motor current characteristic in accordance with a variation in the temperature.

The controller includes a torque sensor for detecting a steering torque of a steering wheel; a motor for supplying a steering assist torque to a steering shaft integrally provided with the steering wheel; and a control unit for driving the motor in accordance with a magnitude of the steering torque. The control unit corrects a motor current command value in accordance with a temperature of the motor, and controls a motor current in accordance with the corrected motor current command value.

3 Claims, 5 Drawing Sheets

CONTROLLER OF ELECTRIC POWER-STEERING SYSTEM

BACKGROUND OF THE INVENTION

1. Field of the Invention

The present invention relates a controller of an electric power-steering system constituted so as to supply a steering assist force produced by an electric motor to the steering system of an automobile or vehicle, particularly to a controller of an electric power-steering system, which compensates a variation in a motor current value according to a temperature variation of the motor.

2. Description of the Related Art

An electric power-steering system of an automobile or a vehicle for generating an assist torque by using a rotation torque of a motor, is constituted to supply a driving force of the motor to a steering shaft or a rack shaft through reduction gears by a transmission mechanism such as a belt or gears. With respect to the above electric power-steering system, a heavy current continuously flows through the motor, if a blocking condition of the steering wheel lasts for a long time under a stationary steering condition, or if operations for putting a car into a garage are repeated for a long time. Therefore, the motor generates heat, and then, fume or smell is released. Furthermore, there is a problem that an accident such as a burning may be introduced.

Conventionally, the motor is provided with a temperature sensor or a radiator of a driving element of the motor is provided with a temperature sensor, and a temperature of a motor winding is estimated in accordance with a temperature detected by the temperature sensor in order to prevent a heat generation caused by an over-using of the motor, or to protect the motor. Furthermore, in a case of a motor protection unit wherein a temperature sensor is not used, as described in the unexamined Japanese patent publication (KOKAI) No. Hei1 (1989)-186468, known is a method of limiting a maximum value of a motor current in accordance with a magnitude of an average current of the motor current at regular intervals.

As described the above, a controller of a conventional electric power-steering system includes a function of preventing a failure caused by an overheat of a motor. However, the controller does not compensate any variation in a motor current characteristic caused by a variation in a temperature. In a case of an electric power-steering system, wherein a motor is arranged in an engine room, a great variation in a temperature such as a variation between −40° C. and 200° C. takes place frequently. According to the variation in the temperature, the motor electric characteristic is changed, and then, an output characteristic of the motor is greatly changed. Therefore, there is a problem that a steering assist characteristic is changed in accordance with a surrounding temperature of the electric power-steering system.

Accordingly, an object of the present invention is to substantially eliminate defects and drawback encountered in the prior art and to provide a controller of an electric power steering system, which corrects a motor current command value by using a motor temperature of the electric power-steering system, and compensates a variation in a motor current characteristic in accordance with a variation in the temperature.

SUMMARY OF THE INVENTION

According to the present invention, the above mentioned object can be achieved by a controller of an electric power steering system includes a torque sensor for detecting a steering torque of a steering wheel; a motor for supplying a steering assist torque to a steering shaft integrally provided with the steering wheel; and a control unit for driving the motor in accordance with a magnitude of the steering torque, so that the control unit corrects a motor current command value in accordance with a temperature of the motor, and controls a motor current in accordance with the corrected motor current command value.

According to the present invention, a motor current command value is corrected by a motor temperature so that a steering assist characteristic is not influenced by a characteristic variation caused by a variation in the motor temperature. Therefore, it is possible to control the steering assist characteristic so as to keep it constant, even if the motor is used under a condition wherein a temperature difference is big.

According to a controller of the present invention, the motor current command value may be corrected by measuring the temperature of the motor. Furthermore, the temperature of the motor may be measured by using a temperature sensor.

According to a controller of the present invention, the motor current command value may be corrected by using an estimated temperature of the motor. In this case, the estimated temperature of the motor may be computed by the following formula:

$$t = (R - R_{20})/\alpha + 20 (°\ C.)$$

Here, t represents the estimated temperature of the motor (° C.), $R_{20}$ represents a resistance between both terminals of the motor with respect to the temperature being 20° C., and $\alpha$ represents a temperature coefficient of a motor winding.

DESCRIPTION OF THE PREFERRED EMBODIMENTS

Preferred embodiments of the present invention will be explained hereinafter with reference to the accompanying drawings.

Figure 1:
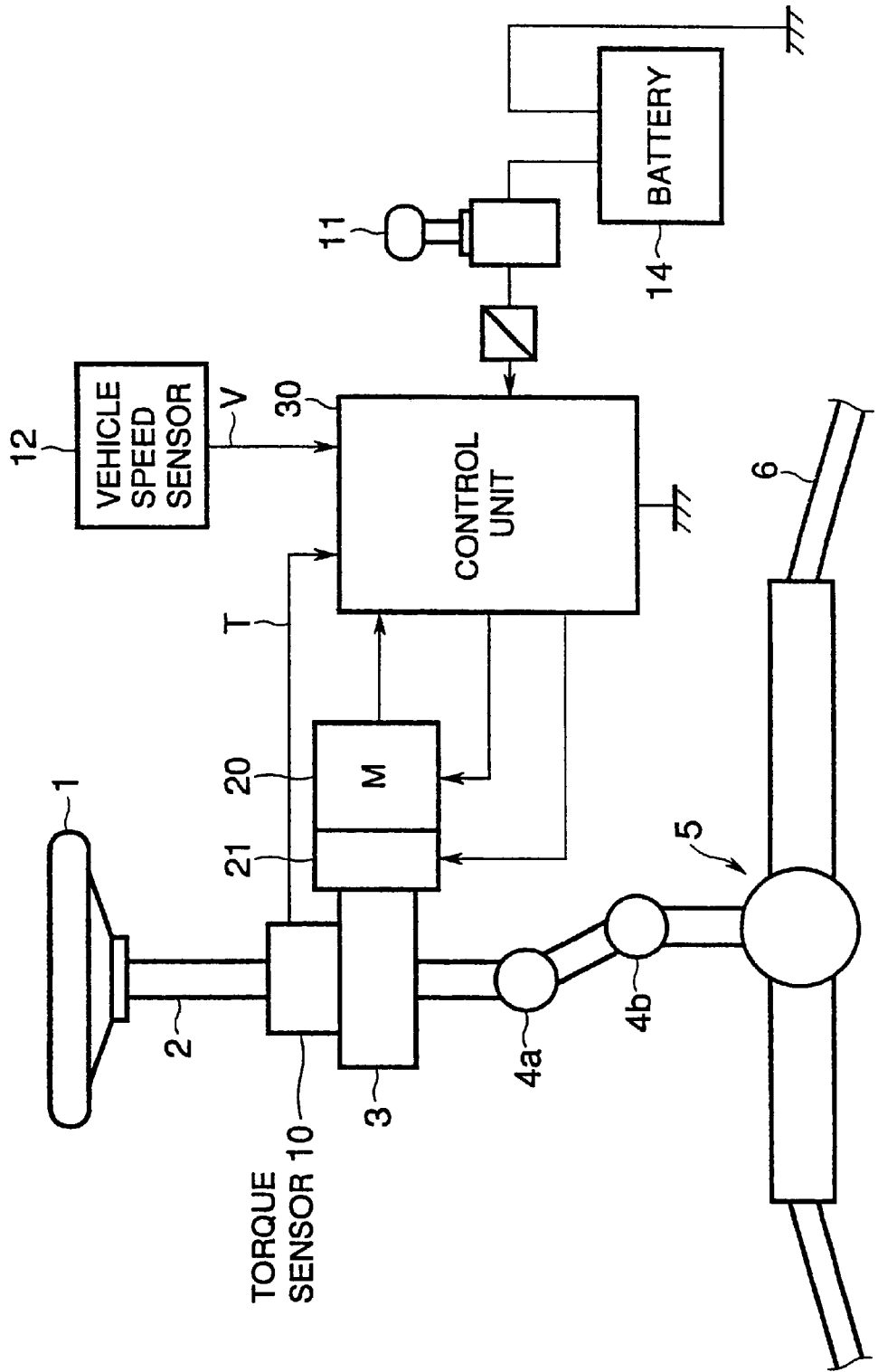
FIG. 1 is a block diagram showing an electric power-steering system.

A general structure of the electric power steering system according to the present invention is explained below by referring to FIG. 1. A shaft 2 of a steering wheel 1 is connected to a tie rod 6 of the traveling wheels through reduction gears 3, universal joints 4a and 4b, and a pinion/rack mechanism 5. The shaft 2 is provided with a torque sensor 10 for detecting the steering torque of the steering wheel 1 and a motor 20 for assisting the steering force of the steering wheel 1 is connected to the shaft 2 through a clutch 21 and the reduction gears 3. Electric power is supplied to a control unit 30 for controlling the power steering system from a battery 14 through an ignition key 11. The control unit 30 computes a steering assist command value I of an assist command in accordance with a steering torque T detected by the torque sensor 10 and a vehicle speed V detected by a vehicle speed sensor 12 and controls the current to be supplied to the motor 20 in accordance with the computed steering assist command value I. The clutch 21 is turned on/off by the control unit 30 and it is turned on (connected) under the normal operating state. Moreover, the clutch 21 is turned off (disconnected) when the control unit 30 judges that the power steering system is broken down and the power supply of the battery 14 is turned off by the ignition key 11.

Figure 2:
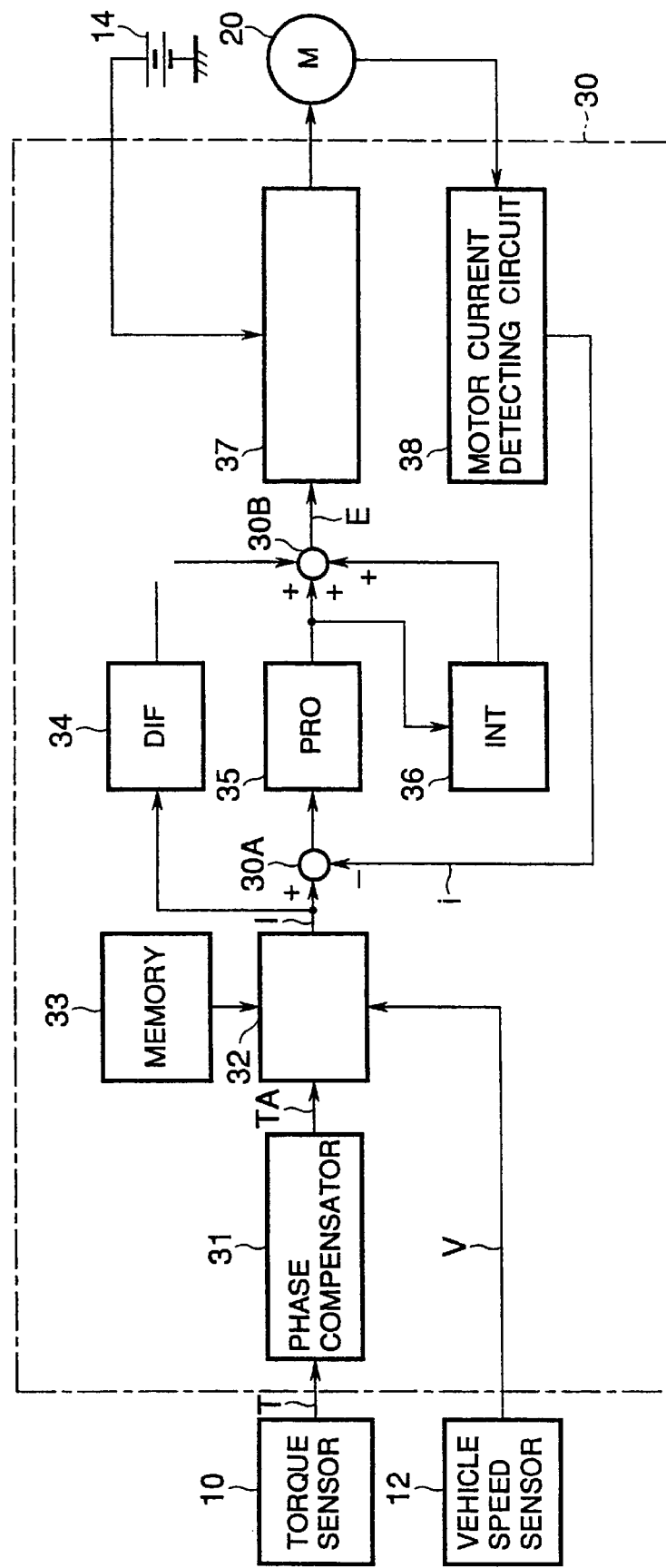
FIG. 2 is a block diagram showing a general internal structure of a control unit.

The control unit 30 mainly comprises a CPU. FIG. 2 shows general functions to be executed by a program in the CPU. For example, a phase compensator 31 does not show a phase compensator serving as independent hardware but it shows a phase compensating function to be executed by the CPU.

Functions and operations of the control unit 30 are described below. The steering torque T detected and inputted by the torque sensor 10 is phase-compensated by the phase compensator 31 in order to improve the stability of the steering system and a phase-compensated steering torque TA is inputted to a steering assist command value computing unit 32. Moreover, the vehicle speed V detected by the vehicle speed sensor 12 is also inputted to the steering assist command value computing unit 32. The steering assist command value computing unit 32 determines the steering assist command value I, which is a control target value of a current to be supplied to the motor 20 in accordance with the inputted steering torque TA and the inputted vehicle speed V, which is provided with a memory 33. The memory 33 stores the steering assist command value I corresponding to the steering torque by using the vehicle speed V as a parameter and the steering command value computing unit 32 computes the steering assist command value I. The steering assist command value I is inputted to a subtractor 30A and also inputted to a differential compensator 34 of a feedforward system for rising a response speed, a deviation (I–i) of the subtractor 30A is inputted to a proportional computing unit 35, and the proportional output of the proportional computing unit 35 is inputted to an adder 30B and also inputted to an integral computing unit 36 for improving the characteristic of a feedback system. Outputs of the differential compensator 34 and the integral computing unit 36 are also additionally inputted to the adder 30B and a current control value E which is a result of addition by the adder 30B is inputted to a motor driving circuit 37 as a motor driving signal. A motor current value "i" of a motor 20 is detected by a motor current detecting circuit 38, inputted to the subtractor 30A, and feedbacked.

Figure 3:
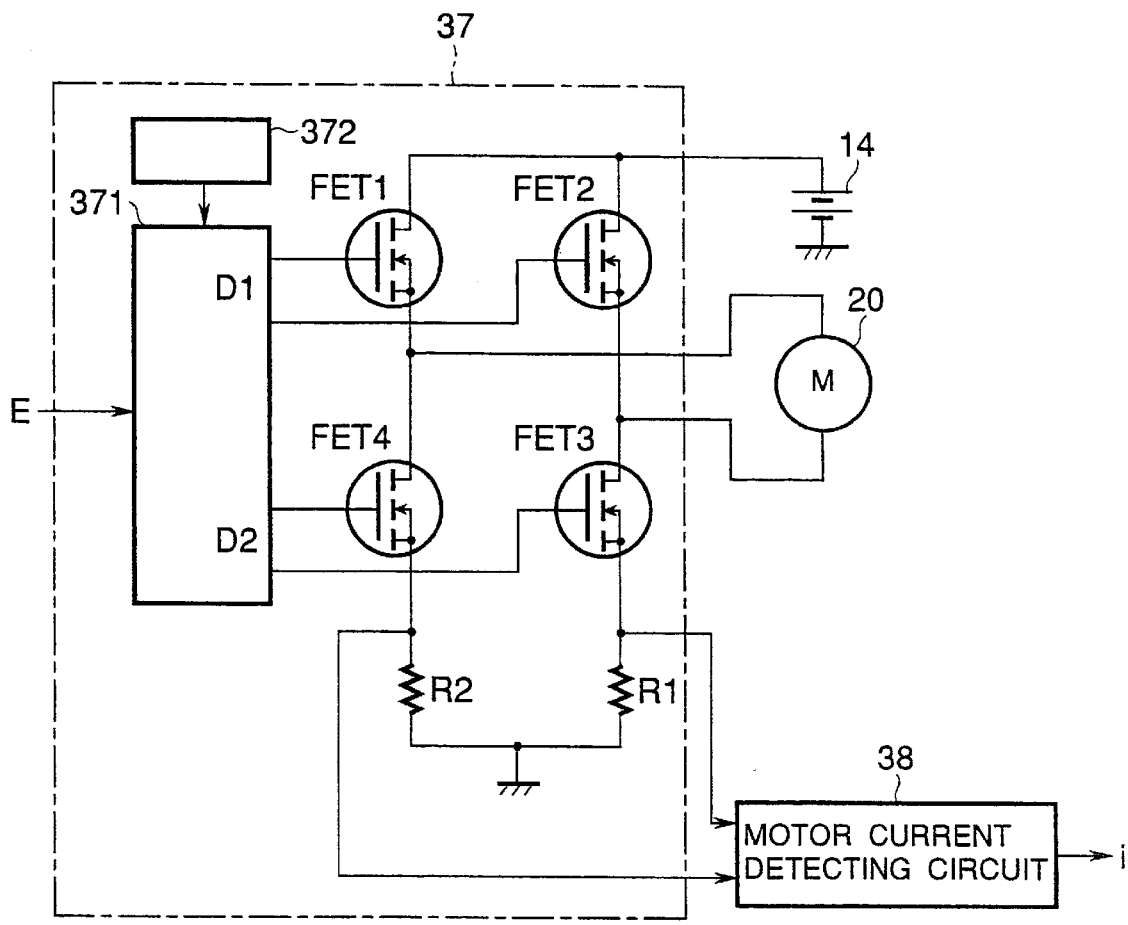
FIG. 3 is a connection diagram showing a motor driving circuit.

A structure of the motor driving circuit 37 is described below by referring to FIG. 3. The motor driving circuit 37 comprises an FET gate driving circuit 371 for driving the gates of field effect transistors (FETs) FET1 to FET4 in accordance with the current control value E supplied from the adder 30B, an H-bridge circuit including the FET1 to FET4, and a boosting power supply 372 for driving the high side of the FET1 and FET2. The FET1 and FET2 are turned on/off in accordance with a PWM signal of a duty ratio D1 determined in accordance with the current control value E and the magnitude of a current Ir actually flowing through the motor 20 is controlled. The FET3 and FET4 are driven in accordance with a PWM signal of a duty ratio D2 defined by a predetermined linear-function formula ("D2=a·D1+b" when assuming "a" and "b" as constants) in a region where the duty ratio D1 is small and turned on/off in accordance with the rotational direction of the motor 20 determined by the code of a PWM signal in a region where the duty ratio D1 is big. For example, if the FET3 is conductive condition, electric current flows through the FET 1, the motor 20, the FET 3 and a resistance R1, and then the electric current having a positive direction flows through the motor 20. On the other hand, if the FET 4 is conductive condition, electric current flows through the FET 2, the motor 20, the FET 4 and a resistance R2, and then the electric current having a negative direction flows through the motor 20. Therefore, the current control value supplied from the adder 30B is also a PWM output. The motor current detecting circuit 38 detects a magnitude of the electric current having the positive direction in accordance with a voltage drop across the resistance R1, and a magnitude of the electric current having the negative direction in accordance with a voltage drop across the resistance R2. The motor current value i detected by the motor current detecting circuit 38 is inputted to the subtractor 30A and feedbacked.

Figure 4:
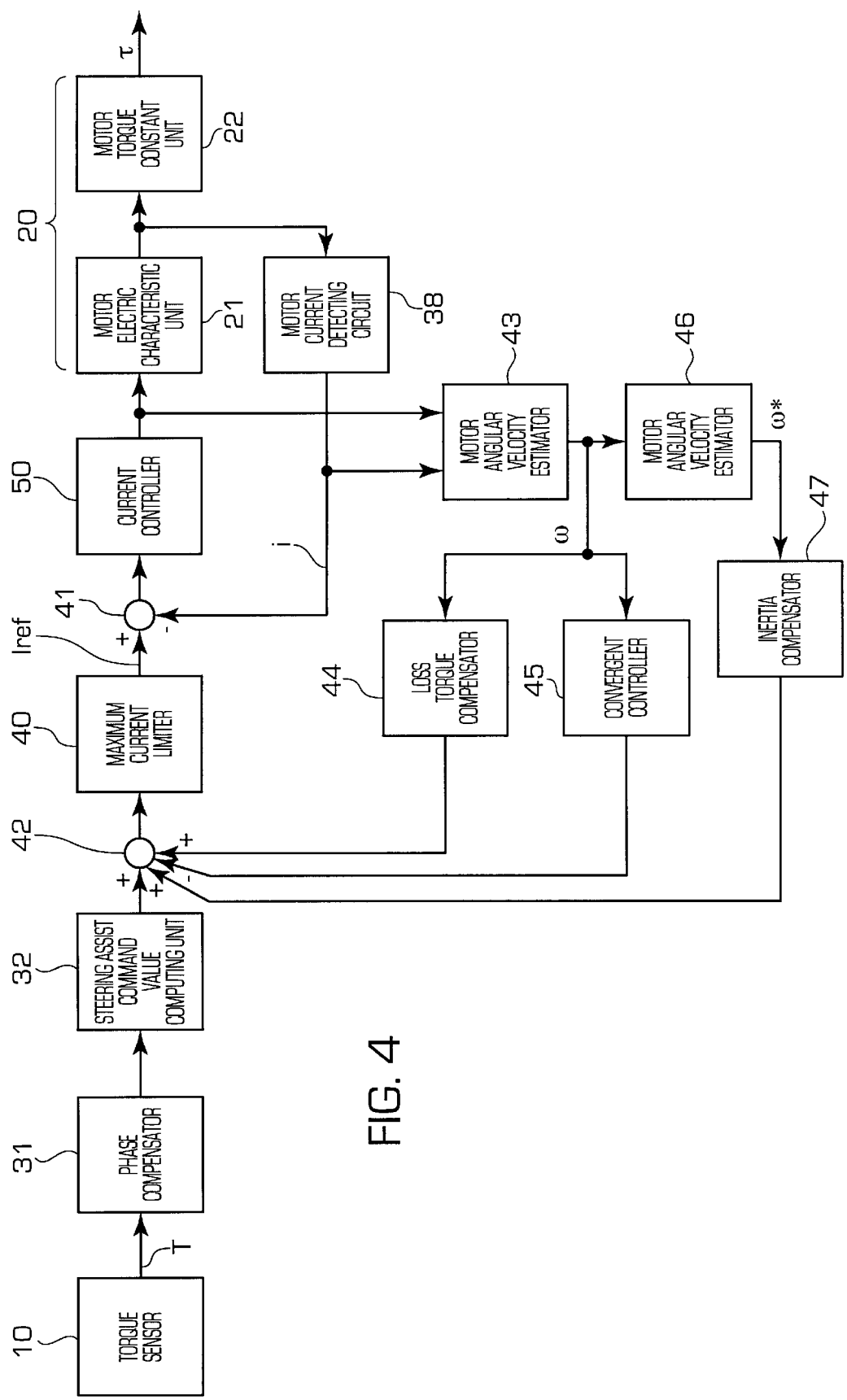
FIG. 4 is a block diagram showing a structure example of a control unit according to the present invention.

According to the present invention, as shown in FIG. 4, the control unit 30 is controlled by determining a motor current command value Iref for steering assist and for compensation control in accordance with the steering torque T detected by the torque sensor 10, so that the motor current value i supplied from the motor current detecting circuit 38 is equal to the motor current command value Iref. The motor current command value Iref is outputted from a maximum current limiter 40 having an upper limit value of +Ilmt and a lower limit value of –Ilmt. A subtractor 41 computes a difference (Iref–i) between the motor current command value Iref and the motor current value i, and then, the differential current (Iref–i) is inputted to a current controller 50. On the other hand, an output of the phase compensator 31 is inputted to the maximum current limiter 40 through the steering assist command value computing unit 32, and a computing unit 42. An angular velocity ω, which is estimated by a motor angular velocity estimator 43 in accordance with the motor current value i supplied from the motor current detecting circuit 38 and a driving current supplied from a current controller 50, is inputted to a loss torque compensator 44 and a convergent controller 45. An angular velocity ω* supplied from a motor angular velocity estimator 46 is inputted to an inertia compensator 47. Each output of the loss torque compensator 44, the convergent controller 45 and the inertia compensator 47 is inputted to the computing unit 42. Furthermore, in FIG. 4, the motor 20 is divided into a motor electric characteristics unit 21 and a motor torque constant unit 22.

The convergent controller 45 refrains a yawing of a steering wheel so as to improve a yaw-convergency of a vehicle. The loss torque compensator 44 outputs a loss torque compensation signal LT so as to cancel an influence of a loss torque of the motor 20, and makes an assist corresponding to the loss torque with respect to a direction, to which the loss torque generates, namely a rotation direction of the motor 20. The inertia compensator 47 makes an assist corresponding to a power generated by an inertia of the motor 20, and outputs an inertia compensation signal so as to refrain a degradation of an inertia characteristics and a control response. Therefore, the estimated value ω inputted to the loss torque compensator 44 indicates a rotation direction of the motor, and the estimated value ω* inputted to the inertia compensator 47 indicates an angular velocity.

A relation between the motor current value i and an output torque τ, wherein $K_T$ is a torque constant, is described as follows:

$$\tau = K_T \cdot i$$

Generally, a steering assist torque is controlled by assuming that the torque constant $K_T$ is constant and by controlling the motor current value i.

Figure 5:
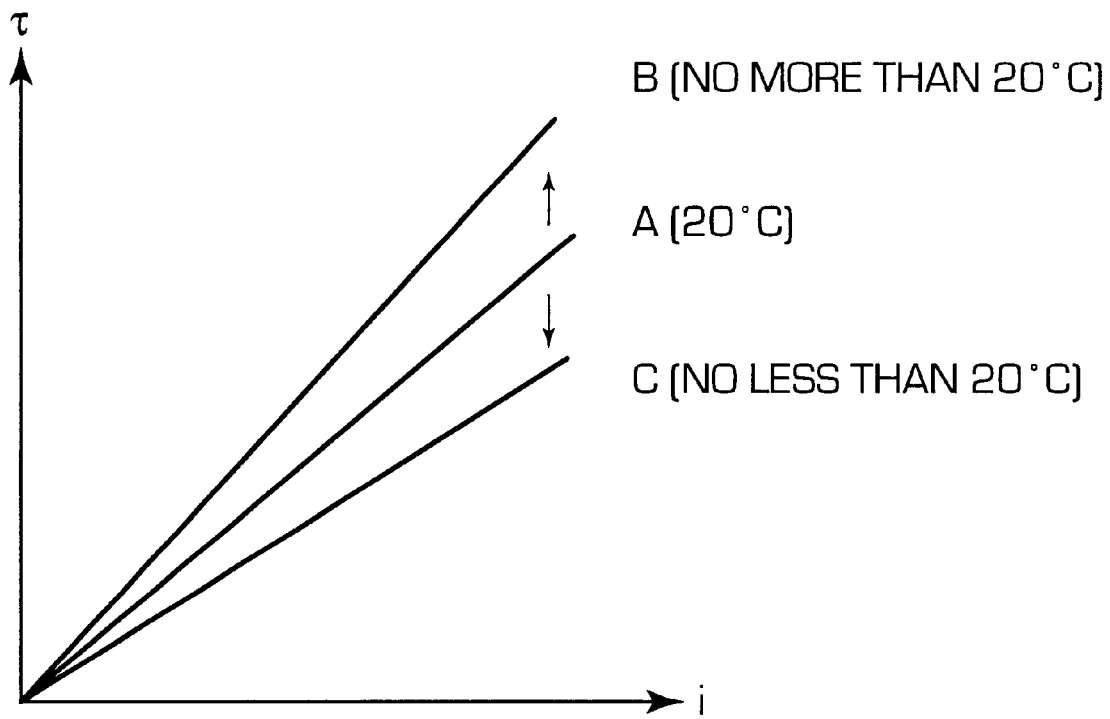
FIG. 5 is a characteristic diagram showing an example of a characteristic of a torque constant.

On the other hand, as shown in FIG. 5, the torque constant $K_T$ of the motor 20 is represented by a function with respect to a temperature t. Therefore, an influence of the temperature is not disregarded, especially when the motor is used under a condition wherein a temperature difference is big. In FIG. 5, a characteristic A represents a torque constant $K_{T20}$, in a case where the temperature is 20° C. If the temperature is increased, a slope of the characteristic A is increased like a characteristic B. If the temperature is decreased, a slope of the characteristic A is decreased like a characteristic C. Therefore, a relation between the torque constant $K_T$ and the temperature t, wherein β is a temperature constant of the torque constant, is described as follows:

$$K_T(t) = \{1 + 0.002(t-20)/\beta\} \cdot K_{T20} \quad (1)$$

The following correction coefficient a is introduced in order to correct a variation in the torque constant $K_T$, caused by the temperature.

$$a = 1/\{1 + 0.002(t-20)/\beta\}$$

Then, a corrected motor current command value Iref* is obtained by correcting the motor current command value Iref with using the correction coefficient a, as described in the following formula.

$$Iref^* = Iref \cdot a \quad (2)$$

Furthermore, if a condition, wherein the motor current command value Iref is equal to the motor current value i by a current control, is satisfied, the output torque τ of the motor 20 is described as follows:

$$\tau = K_T(t) \cdot Iref^* \quad (3)$$

Here, if the formula (3) is substituted by the formulas (1) and (2), $$\tau = K_{T20} \cdot Iref \quad (4)$$

Since the torque constant $K_T$ with respect to the temperature 20° C. is not dependent on the temperature, it is possible to correct a variation in the temperature of the output torque τ. In this case, a steering assist characteristic is set in accordance with a torque constant $K_{T20}$.

Figure 6:
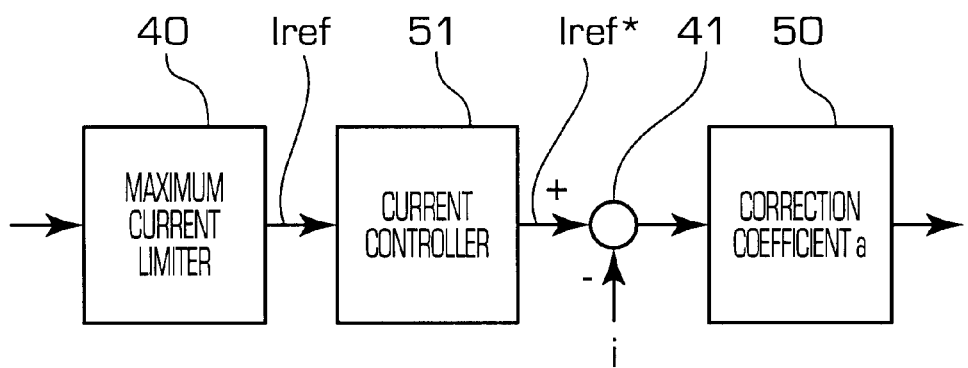
FIG. 6 is a block diagram showing a main portion of the present invention.

Furthermore, the upper limit value of the motor current command value Iref is limited to +Ilmt, and the lower limit value thereof is limited to −Ilmt by the maximum current limiter 40. A maximum value of the motor output torque τ is corrected by correcting the torque constant, as described in the formula (4). For example, if the temperature of the motor is greater than 20° C., the torque constant $K_T$ becomes smaller. Then, the correction coefficient a becomes equal to or greater than 1, and a maximum value of the motor current command value Iref becomes Iref·a. Therefore, it is possible to prevent the maximum value of the motor output torque τ from being decreased. As shown in FIG. 6, the motor current command value Iref is amended by using the correction coefficient a, and then the corrected motor current command value Iref* is inputted to the subtractor 41. For example, the temperature of the motor is estimated by the following formula (5). With respect to the formula (5), a reference temperature is set at 20° C. However, it may be possible to set the reference temperature at any temperature.

$$t = (R - R_{20})/\alpha + 20 (° \text{ C.}) \quad (5)$$

Here, $R_{20}$ represents a resistance between the both terminals of the motor in a case where the temperature is 20° C., and α represents a temperature coefficient of a motor winding. Furthermore, the temperature may be measured by using a temperature sensor.

According to a controller of an electric power steering system of the present invention, a motor current command value is corrected by a motor temperature so that a steering assist characteristic is not influenced by a variation in a characteristic caused by the motor temperature. Therefore, it is possible to refrain a variation in the steering assist characteristic, even if the motor is used under a condition wherein a temperature difference is big.

What is claimed is:

1. A controller of an electric power steering system comprising:

a torque sensor for detecting a steering torque of a steering wheel;

a motor for supplying a steering assist torque to a steering shaft integrally provided with the steering wheel; and a control unit for driving the motor in accordance with a magnitude of the steering torque, so that the control unit corrects a motor current command value in accordance with a temperature of the motor, and controls a motor current in accordance with the corrected motor current command value, wherein the motor current command value is corrected by multiplying the motor current command value by a correction coefficient $a = 1/(1+0.002(t-20)/\beta)$, where t represents an estimated temperature of the motor and β represents a temperature constant.

2. A controller according to claim 1, wherein the estimated temperature of the motor $t=(R-R_{20})/\alpha+20$, where $R_{20}$ represents a resistance between terminals of the motor with respect to the temperature being 20 degrees Celsius, and α represents a temperature coefficient of a motor winding.

3. A controller according to claim 1, wherein the temperature of the motor is measured by using a temperature sensor.

* * * * *